US012297036B2

(12) United States Patent
Gabie

(10) Patent No.: US 12,297,036 B2
(45) **Date of Patent: *May 13, 2025**

(54) VESSEL ASSEMBLY

(71) Applicant: ecoSpirits Pte. Ltd., Singapore (SG)

(72) Inventor: Allen Neil Gabie, Surrey (CA)

(73) Assignee: ecoSpirits Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,198

(22) Filed: Mar. 28, 2023

(65) Prior Publication Data

US 2023/0234772 A1 Jul. 27, 2023

Related U.S. Application Data

(63) Continuation of application No. 17/312,880, filed as application No. PCT/SG2019/050612 on Dec. 13, 2019, now Pat. No. 11,820,585.

(30) Foreign Application Priority Data

Dec. 13, 2018 (SG) ............................ 10201811165V

(51) Int. Cl.
*B65D 85/30* (2006.01)
*B65D 81/127* (2006.01)
(Continued)

(52) U.S. Cl.
CPC ......... *B65D 85/302* (2013.01); *B65D 81/127* (2013.01); *B67D 1/0081* (2013.01);
(Continued)

(58) Field of Classification Search
CPC .......... B65D 2001/0089; B65D 1/0004; B65D 3/0083; B65D 1/0081; B65D 2401/00;
(Continued)

(56) References Cited

U.S. PATENT DOCUMENTS 1,063,503 A 6/1913 Buckley
1,380,020 A 5/1921 Riegel
(Continued)

FOREIGN PATENT DOCUMENTS

AU 2013100764 A4 7/2013
CN 201980555 U 9/2011
(Continued)

OTHER PUBLICATIONS

Chinese First Office Action for Chinese Application No. 201911280996.5, dated Oct. 8, 2022, 19 pages with English translation.
(Continued)

*Primary Examiner* — Chun Hoi Cheung
(74) *Attorney, Agent, or Firm* — TraskBritt

(57) ABSTRACT

Disclosed herein is a protective housing for carrying a rigid vessel. In use, the vessel will contain liquid. The housing comprises a casing. The casing includes a peripheral wall, a base and a top. The base and top are connected to the peripheral wall to define a volume for containing the vessel. The protective housing further comprises an impact absorber. The impact absorber is disposed, in use, between the vessel and casing to reduce transferral, to the vessel, of a force applied to the casing. There is also an aperture in the casing for accessing a closure section of the vessel while the vessel is in the protective housing.

16 Claims, 8 Drawing Sheets

(51) Int. Cl.
*B67D 1/00* (2006.01)
*B67D 3/00* (2006.01)

(52) U.S. Cl.
CPC .......... *B67D 3/0083* (2013.01); *B67D 1/0004* (2013.01); *B67D 2001/0089* (2013.01)

(58) Field of Classification Search
CPC . B65D 25/0885; B65D 81/127; B65D 85/302
USPC .................... 206/512, 503, 521–591; 217/52
See application file for complete search history.

(56) References Cited

U.S. PATENT DOCUMENTS

| | | | | | |
|---|---|---|---|---|---|
| 1,540,659 | A | * | 6/1925 | Smith | B65D 85/302 217/52 |
| 1,598,534 | A | * | 8/1926 | Lefkowitz | B65D 85/302 217/52 |
| 1,832,843 | A | | 11/1931 | Buse | |
| 1,839,860 | A | * | 1/1932 | Baker | B65D 25/108 217/52 |
| 1,945,797 | A | * | 2/1934 | Bach | B65D 85/302 217/52 |
| 2,021,878 | A | | 11/1935 | Lahey et al. | |
| 2,021,879 | A | | 11/1935 | Ahey et al. | |
| 2,103,679 | A | | 12/1937 | Walter et al. | |
| 2,383,717 | A | | 8/1945 | Fisher | |
| 2,410,179 | A | | 10/1946 | Nygren | |
| 2,417,045 | A | | 3/1947 | Brewer | |
| 2,515,127 | A | * | 7/1950 | Lahey | B65D 85/302 217/65 |
| 2,548,638 | A | | 4/1951 | Watson | |
| 5,577,614 | A | | 11/1996 | Palmeroni et al. | |
| 5,924,587 | A | * | 7/1999 | Landman | F42B 39/00 217/65 |
| 8,191,718 | B2 | | 6/2012 | Hovatter | |
| 2010/0089850 | A1 | | 4/2010 | Hovatter | |
| 2015/0225124 | A1 | | 8/2015 | Persson et al. | |
| 2017/0266703 | A1 | | 9/2017 | Borghi et al. | |

FOREIGN PATENT DOCUMENTS

| | | | |
|---|---|---|---|
| CN | 105658530 | A | 6/2016 |
| CN | 106429006 | A | 2/2017 |
| CN | 107185925 | A | 9/2017 |
| CN | 107298236 | A | 10/2017 |
| FR | 1330919 | A | 6/1963 |

OTHER PUBLICATIONS

International Preliminary Report on Patentability for International Application No. PCT/SG2019/050612 dated Dec. 15, 2020, 18 pages.
Resolution of Notification of the Expert Report and Search Report for Chilean Application No. 2021-001551, dated Dec. 20, 2022, 30 pages with English translation.
Supplementary European Search Report and Opinion for European Application No. 19895381, dated Nov. 21, 2022, 8 pages.
International Search Report for International Application No. PCT/SG2019/050612 dated Apr. 6, 2020, 3 pages.
International Written Opinion for International Application No. PCT/SG2019/050612 dated Apr. 6, 2020, 4 pages.
Supplementary European Search Report and Opinion for European Application No. 19895381, dated Nov. 22, 2021, 8 pages.

* cited by examiner

VESSEL ASSEMBLY

CROSS-REFERENCE TO RELATED APPLICATIONS

This application is a continuation of U.S. patent application Ser. No. 17/312,880, filed Jun. 10, 2021, now U.S. Pat. No. 11,820,585, issued Nov. 21, 2023, which is a national phase entry under 35 U.S.C. § 371 of International Patent Application PCT/SG2019/050612, filed Dec. 13, 2019, designating the United States of America and published as International Patent Publication WO 2020/122818 A1 on Jun. 18, 2020, which claims the benefit under Article 8 of the Patent Cooperation Treaty to Singapore patent application Ser. No. 10/201,811165V, filed Dec. 13, 2018.

TECHNICAL FIELD

The present disclosure relates to a protective housing for carrying a vessel, for example, during transit. The vessel is rigid and adapted for containing, for example, consumable spirits. The present disclosure also relates to the combination of such a housing and the vessel itself, and a system or station facilitating dispensing of the contents of the vessel while the vessel remains in the protective housing.

BACKGROUND

In the spirits distribution industry, up to 70% of the base cost of goods sold (COGS) in bottled spirits is comprised of packaging or supply chain-related components. These components include glass bottles, paper labels, stoppers, other packaging elements, cardboard boxes, pallets, logistics and all related labor at each step in the production, distribution and consumption value chain.

Parties whose businesses are in the supply chain, therefore, have little ability to influence costs except through upscaling, that comes with its own risks, and compromises on the quality of the ingredients and ultimate spirit that can reduce the desirability and consequently the sales of the delivered product.

Additionally, the vast majority (>98%) of spirits are consumed in single use glass bottles ranging in format from 700 ml-1,000 ml. These bottles, making up more than 50% of the COGS and as much as 50% of the weight of the item, are discarded after consumption of the spirit. In many countries, glass recycling is minimal and in those that do have a high level of glass recycling, energy consumption for recycling glass is as much as 50% of the energy required to create new glass. Consequently, current packaging technology and distribution practices for spirits create enormous amounts of waste. In 2020, more than 40 billion glass bottles will be produced and consumed globally by the spirits industry.

It is desirable therefore to provide a device or apparatus that removes or ameliorates at least one of the above-mentioned drawbacks of the prior art—for example, by reducing the COGS and facilitating reuse of spirits bottles—or at least provides a useful alternative.

BRIEF SUMMARY

Disclosed herein is a protective housing for carrying a rigid vessel containing liquid, the protective housing comprising:

a casing comprising:

a peripheral wall;

a base; and a top, wherein the base and the top are connected to the peripheral wall to define a volume for containing the vessel, the protective housing further comprising:

an impact absorber disposed, in use, between the vessel and casing to reduce transferral to the vessel of a force applied to the casing; and an aperture in the casing, for accessing a closure section of the vessel while the vessel is in the protective housing;

wherein the aperture is in the top of the casing and the top is inset into the peripheral wall so that, in use, the closure section of the rigid vessel can protrude through the aperture while remaining within a profile of the peripheral wall.

The "aperture in the casing" may be any form of aperture or access that permits access to the vessel while not permitting the vessel to inadvertently come out of the housing. In some embodiments, such an access is in the form of a window or hole, through which the closure section of the vessel projects or through which a hand or implement can fit with which to access the closure section of the vessel.

The impact absorber may comprise a plurality of impact absorbing members. Each of the peripheral wall, base and top may be spaced, in use, from the vessel by a respective impact absorbing member. In other embodiments, portions of the casing—e.g., the base or top—may be formed from impact absorbing material such that it can contact the vessel while providing the relevant shock absorbing function. Such a base or top may be secured to an internal side of the peripheral wall.

The casing may have an external profile, with the protective housing further comprising a handle fixed to, and within the profile of the casing. The casing may comprise a window, the handle being secured across the window to thereby be accessible from outside the casing. The window can enable visibility of the vessel for determining how full it is. Moreover, by positioning the handle across the window, objects that may otherwise pass through the window and impact the vessel may be prevented from doing so by the handle. The handle may be spaced, in use, from the vessel.

The casing may have a polygonal cross-section, the handle being disposed in a corner of the casing—i.e., a corner of the peripheral wall. The peripheral wall may form a square cross-section body so that the casing is square in cross-section. The handle may be one of two handles, the two handles being disposed in opposite corners of the casing.

The peripheral wall of the casing may be formed from at least two identical wall sections. Each identical wall section may have two opposed sides adapted to be connected to a respective opposed side of another of the identical wall sections, thereby to form the peripheral wall. The peripheral wall may have a polygonal cross-section, with each identical wall section comprising at least two panels. One of the at least two panels may be wider than another of the at least two panels. At least one of the opposed sides of each identical wall section may comprise countersunk holes for receiving the head of a fastener for securing the respective identical wall section to another of said identical wall sections. In other embodiments, the peripheral wall may be formed from two or more panels that are movably connected—e.g., by a hinge—to enable the peripheral wall to open to remove the vessel from the casing. The two or more panels may also have a locking mechanism—e.g., a clasp or clip—to fasten the two or more panels together to retain the vessel in the casing. The hinge and locking mechanism may be disposed on opposite sides or opposite corners of the casing.

The protective housing may further comprise a tie connector on the casing for receiving a tie that passes through a closure connected to the closure section of the vessel, thereby to indicate whether the closure has previously been removed from the vessel.

In the protective housing, the peripheral wall may have two opposite ends, with one or more protrusions, or a nesting plate, at one of the opposite ends and at least one depression at another of the opposite ends, the at least one depression being arranged to receive one or more protrusions or nesting plate of another protective housing so that the protective housing can be stably stacked on top of an identical protective housing.

The present disclosure further provides a vessel assembly for carrying a liquid, comprising:

- a rigid vessel having:
  - a body for containing the liquid; and
  - a closure section though which the liquid can be dispensed; and
- a protective housing as described above for carrying the rigid vessel.

The vessel may have a circular cross-section and the peripheral wall may have a square cross-section having four sides of equal width, so that the vessel abuts the impact absorber at midpoints of the sides of the peripheral wall and the vessel is spaced from the peripheral wall at corners between said sides.

The vessel may comprise a closure for sealing the closure section, the closure having a plurality of tie connectors equidistantly disposed about a circumference of the closure, the tie connectors being odd in number so that no tie connector is diametrically opposite any other tie connector.

The closure section may comprise, in use, a dispensing assembly for selectively dispensing the liquid. The dispensing assembly may comprise a valve for selectively dispensing a predetermined volume of the liquid.

The present disclosure also provides a dispensing station comprising:

- a support for supporting at least one vessel assembly as described above in a dispensing condition wherein the closure section is directed downwardly so that liquid flows under force of gravity to the closure section.

In the dispensing station:

- the vessel assembly may comprise one or more protrusions and the support may similarly comprise at least one depression arranged to receive the one or more protrusions; or
- alternatively, the vessel assembly may comprise at least one depression and the support may similarly comprise one or more protrusions arranged to be received in the at least one depression,
- so that the vessel assembly is stably seated on the support in the dispensing condition.

BRIEF DESCRIPTION OF THE DRAWINGS

Some embodiments of a housing, vessel assembly and dispensing station, in accordance with present teachings will now be described, by way of non-limiting example only, with reference to the accompanying drawings in which.

DETAILED DESCRIPTION

Embodiments of the protective housing described herein provide protection for a rigid—e.g., glass—vessel while in transit, during use and at other times. In some embodiments there are exposed areas of the vessel, for example, through a window in a casing otherwise enclosing the vessel. In these embodiments, the exposed areas will usually nevertheless be protected from impacts, for example, by a handle extending across the window.

In addition, due to the protection afforded by the protective housing, the vessel can be larger than traditional spirits vessels.

Figure 1:
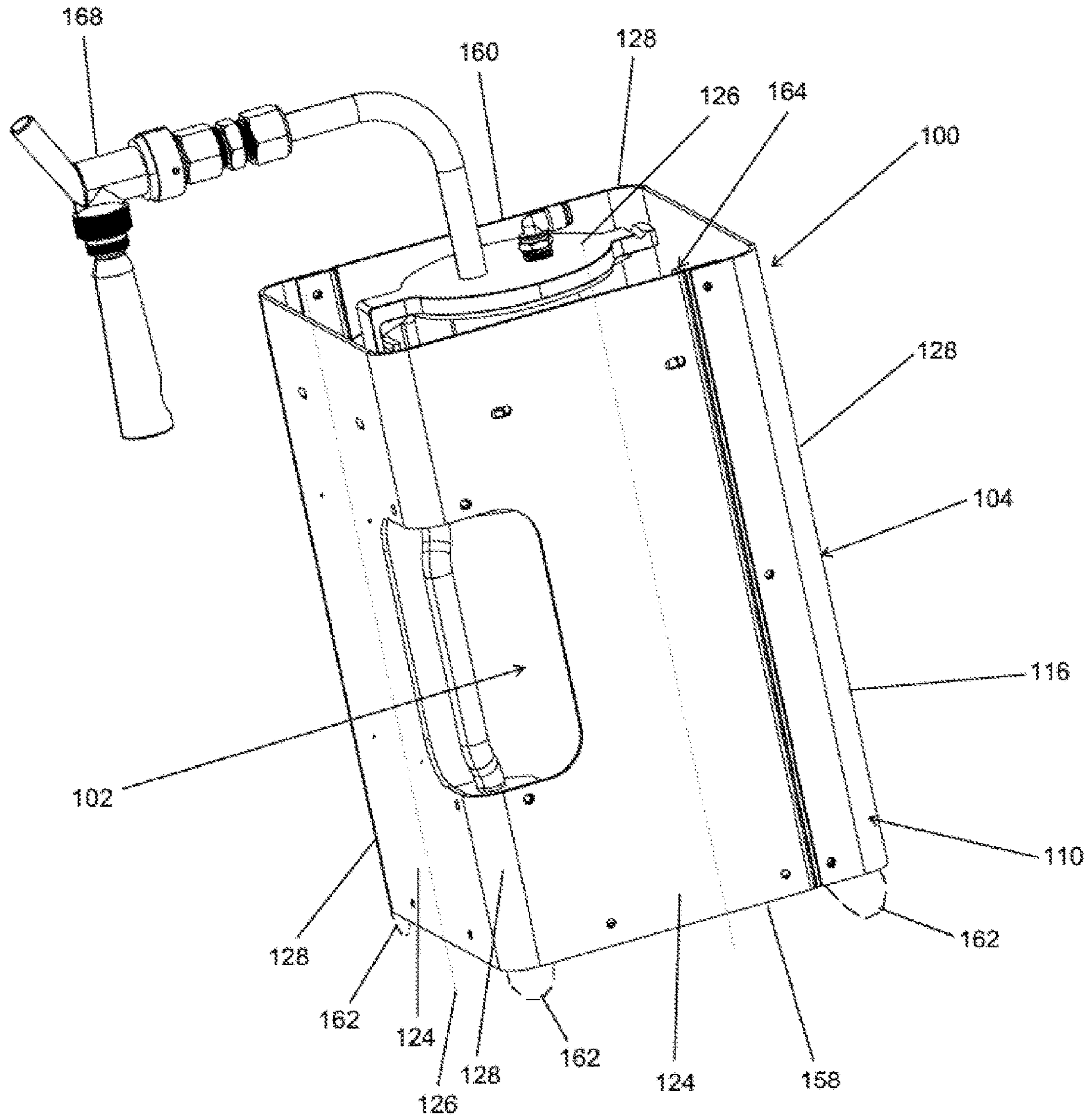
FIG. 1 is an image of a vessel assembly in accordance with present teachings.

FIG. 1 shows a vessel assembly 100 for carrying a liquid. The liquid may be a spirit, such as vodka, rum, tequila, whisky, gin or another type of spirit or liqueur. The vessel assembly 100 broadly comprises:

- a rigid vessel 102; and
- a protective housing 104, which may also be referred to as a protective enclosure.

The vessel 102 is used to contain the liquid. The liquid may be a spirit such as a distilled, consumable spirit—e.g., vodka, rum, tequila, whisky, gin or other type of spirit or liqueur.

Since spirits are generally solvents, the vessel 102 should be resistant to dissolution. While the vessel 102 may be formed from any suitable material, the present vessel 102 is formed from glass though, in some embodiments, metal or some plastics may be used. Advantageously, the protective housing 104 is capable of protecting similar vessels formed from other materials that are rigid in the sense of being frangible or brittle.

Figure 5:
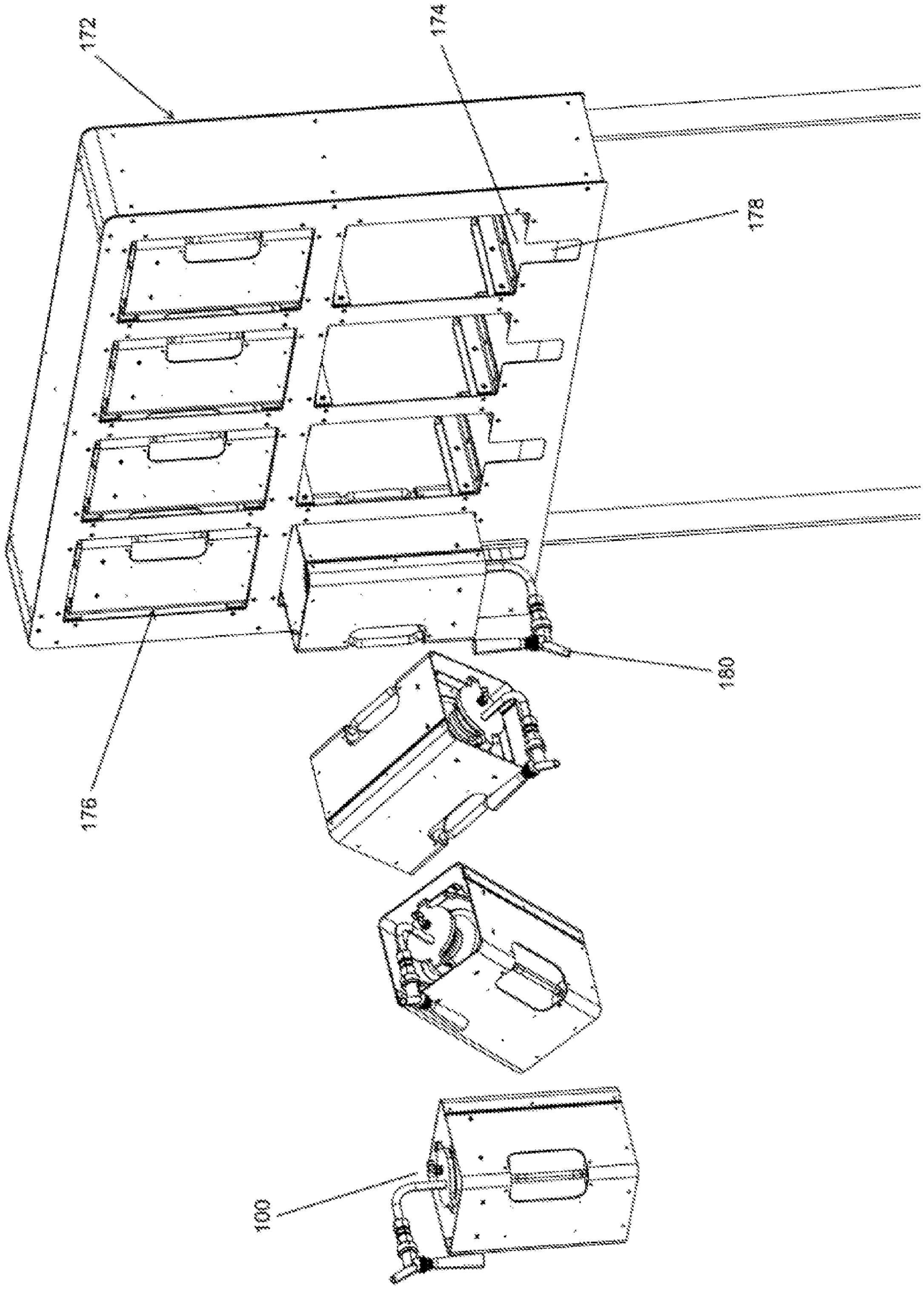
FIG. 5 illustrates the rotation or inversion of a vessel assembly for receipts into a dispensing station.

Since the vessel 102 is protected by the protective housing 104 against some impacts, it may have a larger capacity than standard 750 mL or 1 L spirits bottles. For example, the vessel 102 may have a capacity of 1.5 L, 2.0 L, 2.25 L, 3.0 L, 3.75 L, 4.0 L, 4.5 L, 9.0 L or another desired volume. In preferred embodiments, the volume of the vessel 102 is a whole multiple of a standard volume spirits bottle. Thus, the vessel 102 will be emptied upon complete filling of a particular number of spirits bottles as shown in FIG. 5.

Figure 3:
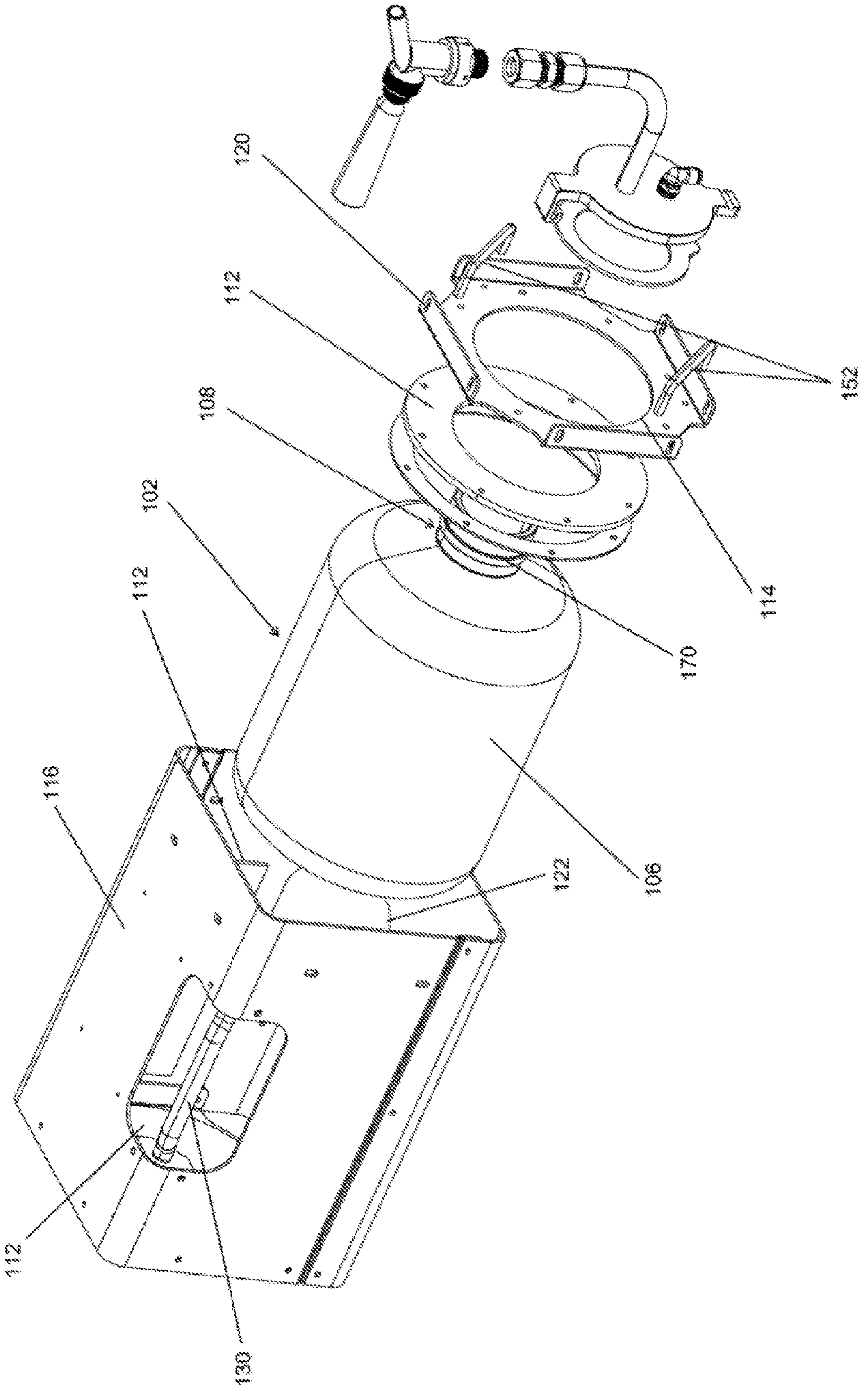
FIG. 3 is an exploded view of the vessel assembly of FIG. 1, with the protective housing in a partially assembled condition.

With reference to FIG. 3, the rigid vessel 102 has a body 106 for containing the liquid, and a closure section 108 through which the liquid can be dispensed. The body 106 may be any desired shape. In the present embodiment, the body 106 is cylindrical. Thus, the body 106 has a circular cross-section. The skilled person will appreciate that the term "cylindrical" does not mean the ends of the body 106 terminate exactly at right angles with the sidewall of the body 106. Rather, the present body 106 and thus vessel 102 may be cylindrical in a similar sense of a standard wine or spirit bottle being cylindrical.

With further reference to FIG. 1, the vessel 102 is received in the protective housing 104. The protective housing 104 carries the rigid vessel 102 and broadly comprises:

- a casing 110;
- an impact absorber, presently comprising a plurality of impact absorbing members 112—see FIG. 3—each in the form of a rubber sheet; and
- an aperture 114 (see FIG. 2) in the casing 110.

The casing 110 substantially encloses the vessel 102 in use. The casing 110 may be formed from any desired material, such as injection molded plastic. However, the casing 110 is presently formed from a deformable, or readily deformable, material such as aluminum. This ensures the casing 110 will preferentially collapse, as opposed to fracturing of the vessel, if the vessel assembly is dropped. The casing 110 is, therefore, sacrificial.

The protective housing 104 or casing 110, or parts thereof, may instead be made from plastics—e.g., recycled plastic—or from another deformable material that is able to be repeatedly returned to its original condition by reversing any deformation resulting from inadvertent impacts or dropping of the vessel assembly, or that may be energy efficiently melted down and reformed back into a casing.

The casing 110 may be formed from an opaque material, a non-transparent material, or a material that is otherwise non-light transmissive—i.e., does not permit the passage of light through the material. This reduces or avoids the exposure of liquid in the vessel 102 to sunlight, and thereby reduces or avoids degradation or other change in that liquid in the event that such degradation or change would result from exposure to sunlight.

Figure 2:
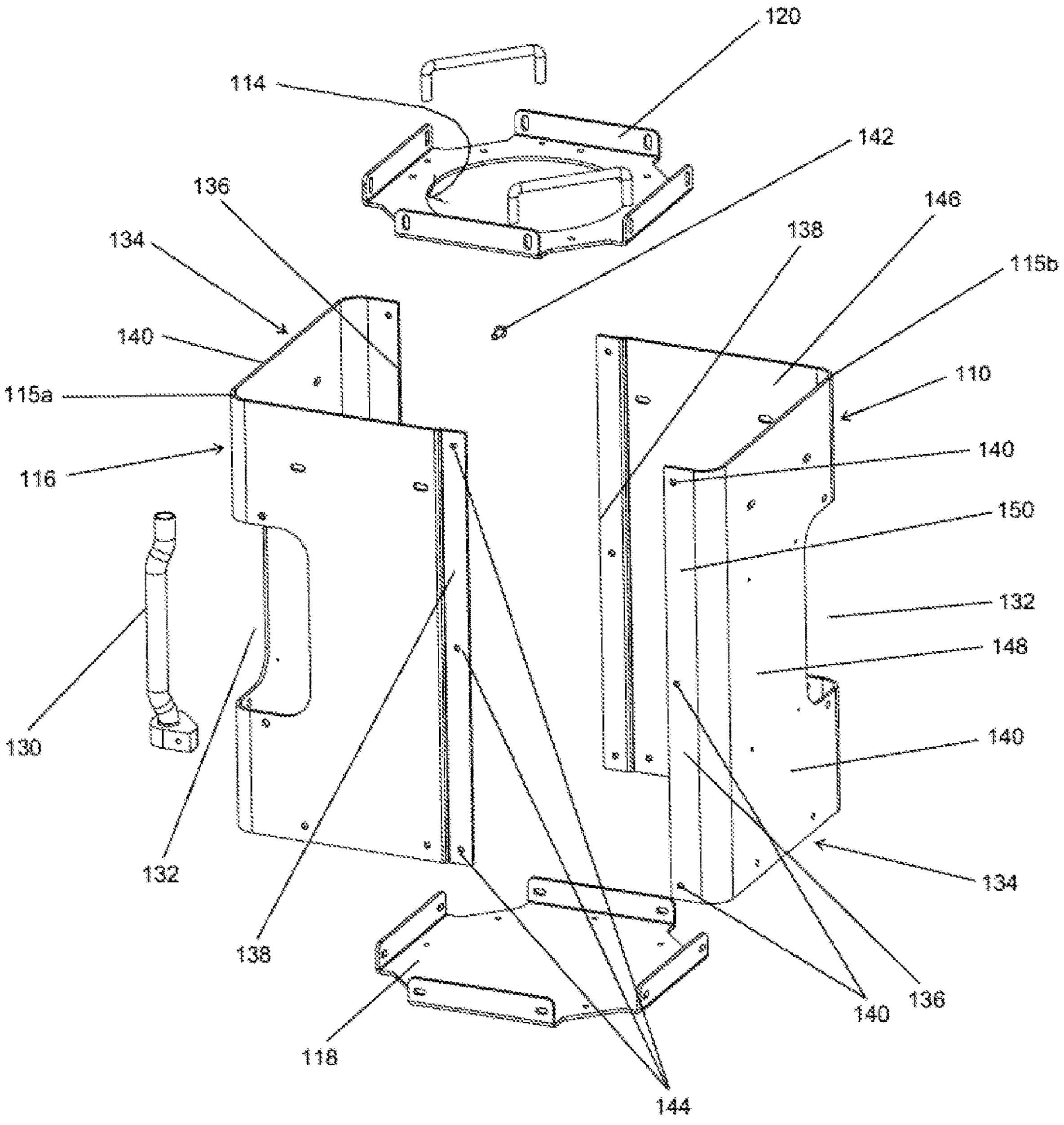
FIG. 2 is an exploded view of a protective housing in accordance with present teachings.

The casing 110 comprises:

- a peripheral wall 116 and, as best seen in FIGS. 2 and 3:
  - a base 118; and
  - a top 120.

Presently, the top 120 is in the form of a collar, with the aperture 114 formed therein.

The base 118 and top 120 are connected to the peripheral wall 116 to define a volume 122 for containing the vessel 102. The impact absorber (impact absorbing members 112) is disposed between the vessel 102 and casing 110 to reduce transferral, to the vessel 102, of a force applied to the casing 110.

The peripheral wall 116 may comprise one or more corners. There may similarly be corners between the base 118 and peripheral wall 116, and between the top 120 and peripheral wall 116. One or more of the corners may be reinforced. In alternative embodiments, the corners are not reinforced—for example, the material at the corners may be of the same thickness as the material of the peripheral wall 116, base 118 or top 120. By avoiding reinforcement, the corners will deform more readily, in the event of pressure or impact, thereby protecting the vessel 102.

While the present peripheral wall 116 is formed from two wall sections 134 connected at a point along sides of the peripheral wall 116, there may instead be two panels movably joined. For example, the wall section may instead meet at corners 115*a* and 115*b*, with a movable mechanism—e.g., a hinge—at corner 115*a* and a clip or fastener provided at another, presently opposite corner—corner 115*b*. This would enable the peripheral wall 116 to open by relative movement between the wall sections, to enable removal or insertion of the vessel into the casing 110.

The impact absorber may be a foam or rubber layer for absorbing shock and distributing shock over a larger area of the vessel than that over which it would otherwise have been distributed with direct contact between the peripheral wall 116 and vessel 102. The impact absorber may be attached by any suitable means, such as adhesion, to the internal surface of the casing.

The impact absorber presently comprises a plurality of impact absorbing members 112. Each of the peripheral wall 116, base 118 and top 120 is spaced from the vessel 102 by a respective impact absorbing member 112. For the base 118 and peripheral wall 116 the impact absorbing members 112 are substantially rectangular pads. An impact absorbing member 112 is disposed between each side of the peripheral wall 116 and vessel 102. Presently, the vessel 102 has a circular cross-section and the peripheral wall 116 has a square cross-section. Thus, the peripheral wall 116 has four sides 124 of equal width and the vessel 102 abuts the impact absorber at midpoints/midlines 126 of the sides 124 of the peripheral wall 116. Due to the dissimilar shape of the vessel 102 and peripheral wall 116, namely the former being circular and the latter being rectangular in cross-section, the vessel 102 is spaced from the peripheral wall 116 at corners 128 between the sides 124.

The casing 110, more particularly the top 120, includes aperture 114 for accessing the closure section 108 of the vessel 102 while the vessel 102 is in the protective housing 104. The impact absorbing member 112 between the casing 110 and closure section 108 is thus shaped to fit around the closure section 108—presently, a cylindrical closure section 108 and thus a ring-shaped or annular impact absorbing member 112.

The closure section 108 may be accessible, yet recessed within the protective housing 104, or may project through the aperture 114. Thus, the vessel 102 being "in" the protective housing 104 is intended to mean functionally within such that the protective housing 104 protects the vessel 102 from impacts.

With reference to FIG. 2, the casing 110 has an external profile. The term "profile" is intended to mean the shape generally defined by the outer surface of the protective housing 104. For example, the top 120 of the casing 110 is inset into the peripheral wall 116. The top 120 is thus within the profile of the peripheral wall 116. Since the top 120 includes the aperture 114, the closure section 108 of the rigid vessel 102 protrudes through the aperture 114 while remaining within the profile of the peripheral wall 116.

Figure 8:
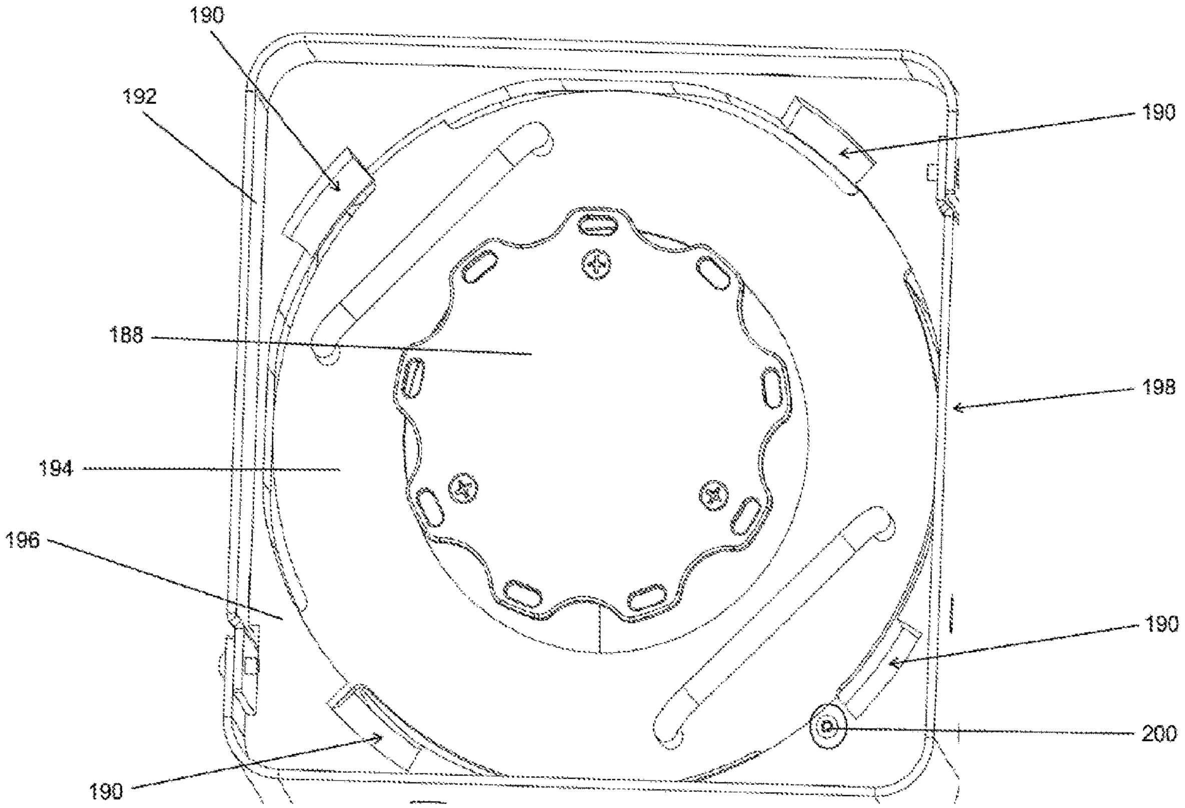
FIG. 8 is an alternative embodiment of a top of a vessel assembly in accordance with present teachings.

The top 120 is fastened—e.g., using screws or rivets—to the peripheral wall 116. In an alternative embodiment as shown in FIG. 8, the top 188 comprises a locking mechanism. The locking mechanism 190, presently in the form of a plurality of bayonet mounts 190, facilitates separation of the top 188 from the peripheral wall 192, or separation of a first portion 194 of the top 188 from a second portion 196. The first portion 194 must be of sufficient size to admit the vessel into the casing 198 and to enable its removal therefrom—e.g., for cleaning. A tamper-resistant or tamper device 200 may also be provided, to ensure the locking mechanism 190 either cannot be activated without undoing the tamper-resistant device 200 (e.g., where the tamper-resistant device 200 comprises a key lock, using the key) or the device breaks or otherwise makes the fact of tampering evident.

The protective housing 104 also includes a handle 130 fixed to, and within the profile of, the casing 110. The handle 130 is secured across a window 132 of the casing 110. The handle 130 is, therefore, accessible from outside the casing 110. Presently, there are two such handles 130, only one of which is shown in FIG. 2. Each handle 130 is located in a corner 128 of the casing 110—"in a corner" may include exactly at the corner 128 or recessed slightly inwardly into the volume 122 of the casing 110 but nevertheless functionally accessible at the corner 128 of the casing 110. The casing 110 is square—though it may have any desired polygonal or other shape—and the handles 130 are located in opposite corners 128 of the casing 110. Moreover, the corners (i.e., of the peripheral wall, between panels of the peripheral wall) are presently rounded—this reduces the potential for the casing scratching other surfaces.

The handles 130 are spaced from the vessel 102. This is achieved by positioning the handles 130 in the corners 128. Since the vessel 102 has a circular cross-section and the peripheral wall 116, in which windows 132 are formed, has a square cross-section, the vessel 102 is at its furthest from the peripheral wall 116 in the corners 128. As the handles 130 are in the corners, a user's fingers can readily slide between the handles 130 and vessel 102.

In addition, each handle 130 extends across a respective window 132. Thus, while the respective window 132 may be used to view the level of liquid in the vessel 102 while in use, the handle 130 protects the vessel 102 from corner impacts on the peripheral wall 116. Relatedly, the vessel 102 may include graduations (not shown) visible through the window 132 to visibly indicate a level of liquid in the vessel 102. The graduations may be either be standard level graduations, e.g., 100 mL, 200 mL and so on, or may alternatively, or in addition, be graduations that designate the number of spirits bottles that could be filled by the remaining liquid in the vessel 102, e.g., 750 mL, 1500 mL, 2250 mL and so on. The graduations may be provided in the vessel 102 itself, or on the casing 110—e.g., along an edge of window 132 so that the level of liquid in the vessel 102 can be compared against the graduations.

As shown in FIG. 2, the peripheral wall 116 of the casing 110 is formed from two identical wall sections 134. Making the wall sections 134 identical enables the unassembled peripheral walls of multiple protective housings 104 to be compactly stacked together for transport and storage. It will be appreciated that more than two identical wall sections 134 may be provided in some embodiments, or the wall sections may not be identical, depending on the desired profile of the peripheral wall 116.

Figure 4:
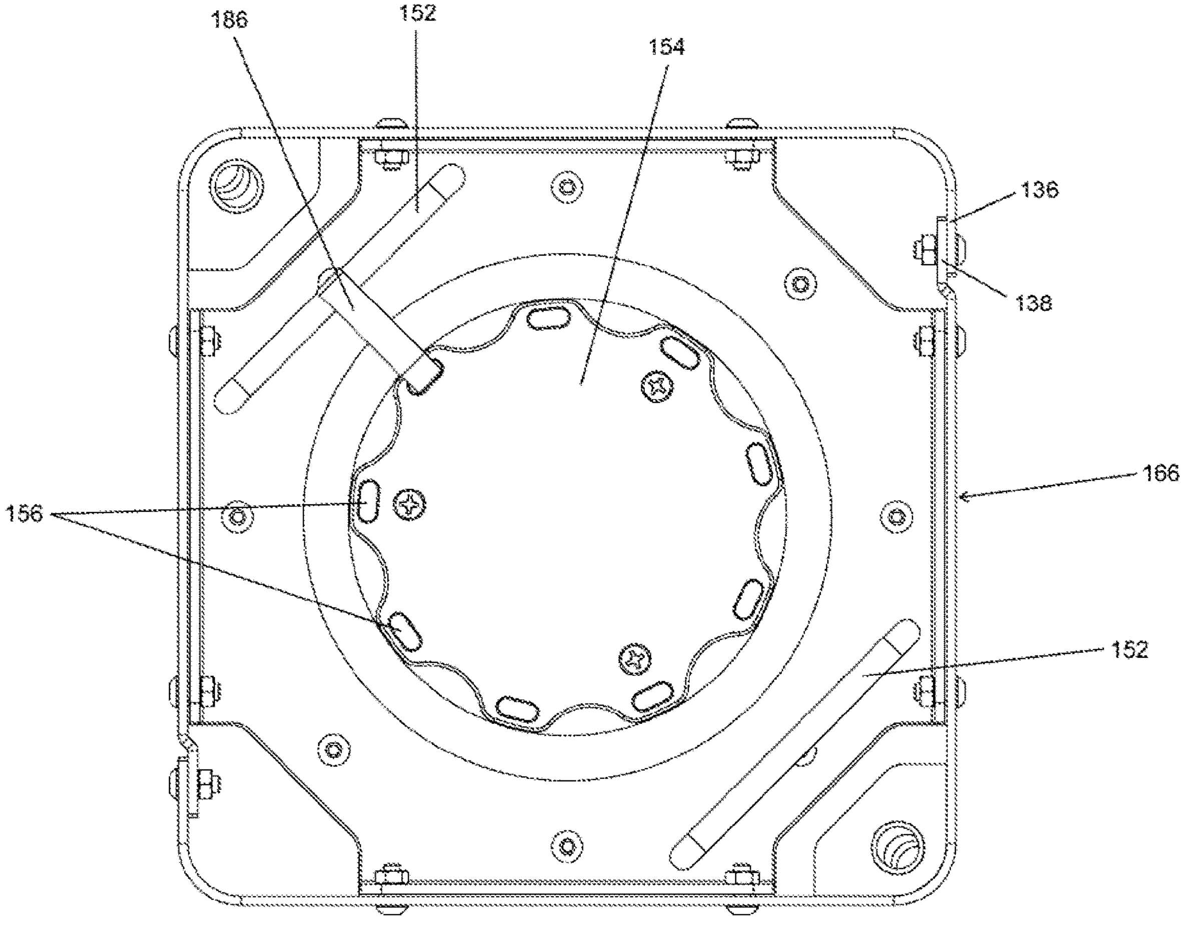
FIG. 4 is an image of a vessel assembly similar to that of FIG. 1 with a closure instead of a dispensing assembly.

Each wall section 134 has two opposed sides 136, 138 adapted to be connected to a respective opposed side 138, 136 of another of the identical wall sections 134, thereby to form the peripheral wall 116. At least one of the opposed sides 136, 138 of each identical wall section 134 comprises countersunk holes 140 for receiving the head of a fastener 142 for securing the wall sections 134 together. Since one of the opposed sides 136 of one wall section 134 will overlap the opposed side 138 of another wall section 134 when the two wall sections 134 are secured together (as best seen in FIG. 4), there is no need to countersink the fastener holes 144 in opposed side 138.

Each wall section 134 has at least two, and presently three, panels 146, 148, 150. One of the panels, panel 146, is wider than another of panels, panel 150. One of the opposed sides 138 is provided on the wider panel 146 and the other opposed end 136 is provided on the thinner panel 150. Thus, when a panel 146 of one wall section 134 is secured to panel 150 of another wall section 134, the connection between the two wall sections 134 is offset from the midline or centerline 126. This is useful in case any fasteners project into the volume 122 after assembly of the peripheral wall 116. By offsetting the connections from the centerline 126, any such fasteners will project into a portion of the volume 122 closer to the corners 128 and thus into a portion of the volume 122 where the vessel 102 is spaced from the casing 110 in the embodiment shown.

Since the present vessel assembly 100 is reusable, one difficulty faced by distributors is ensuring the vessel assembly 100 is tamperproof or that tampering is evident. To this end, the protective housing 104 includes a tie connector 152 on the casing 110. The tie connector 152, of which there is presently one, receives a disposable tie 186 (e.g., cable tie or car seal) that passes through a closure 154 (see FIG. 4) connected to the closure section of the vessel, thereby to indicate whether the closure has previously been removed from the vessel. In alternative embodiments, two tie connectors, or more than two tie connectors may be provided.

The closure 154 of the vessel 102 seals the closure section 108. Once sealed, the closure 154 can be used to ensure tampering is evident. The closure 154 has a plurality of tie connectors 156 equidistantly disposed about its circumference. There is an odd number of the tie connectors 156. This ensures no tie connector 156 is diametrically opposite any other tie connector 156. Therefore, the tie connectors 156 can be configured such that there is always one tie connector 156 that is closest, of all the tie connectors 156, to one of the tie connectors 152 of the casing 110.

The peripheral wall 116 has two opposite ends 158, 160, with one or more protrusions 162 (shown in broken lines) at one of the opposite ends 158 and at least one depression 164 at another of the opposite ends 160. The at least one depression 164 is arranged to receive the one or more protrusions of another protective housing (not shown) so that the protective housing 104, and thus the vessel assembly 100, can be stably stacked on top of an identical protective housing or vessel assembly (not shown).

Presently, there is a protrusion 162 in each corner 128 of the casing 110. There may instead be a nesting plate located within the profile of the peripheral wall, to provide either a flat surface at the top, to be received in a shallow recess in the base of another vessel assembly, or a flat surface at the bottom, to provide a smooth surface for sitting the vessel assembly on a table or counter, and for nesting within the top of another vessel assembly.

The term "stably," as used in the phrases "stably seated," "stably stacked" and similar means the there is some resistance to lateral movement of one vessel assembly with respect to another, vertically neighboring vessel assembly. The vessels assemblies are thus held in register when the protrusions are received in the at least one depression.

While the vessel assembly 166, shown in FIG. 4 comprises a closure 154, the closure section 108 of the vessel assembly 100 of FIGS. 1 and 3 comprises a dispensing assembly 168 for selectively dispensing the liquid. The dispensing assembly 168 may be any standard or non-standard dispensing assembly, such as a simple manually actuated tap, or a valve assembly comprising a valve for selectively dispensing a predetermined volume of the liquid. In the present case, the closure section 108 of the vessel 102 includes an open neck 170 per standard flasks. The opening of the neck 170 is sized to receive a cleaning bulb to facilitate cleaning of the internal volume of the vessel 102.

FIG. 5 illustrates a dispensing station 172 for use in dispensing liquid from four vessel assemblies such as vessel assembly 100 of FIG. 1. The dispensing station includes a support 174. While the present dispensing station 172 supports four vessel assemblies for dispensing liquid therefrom, dispensing stations may be similarly provided for dispensing one or more vessel assemblies as required for the particular application.

The vessel assembly(ies) for dispensing are supported on a support 174 of the dispensing station 172. The vessel assemblies are rotated into a dispensing condition as illustrated, so that liquid flows under force of gravity to the closure section. The support 174 then supports the vessel assemblies in the dispensing condition.

The dispensing station 172 also includes a storage section 176 for storing vessel assemblies before or after use. The vessel assemblies in the storage section 176 are not equipped with dispensing assemblies.

Figure 6:
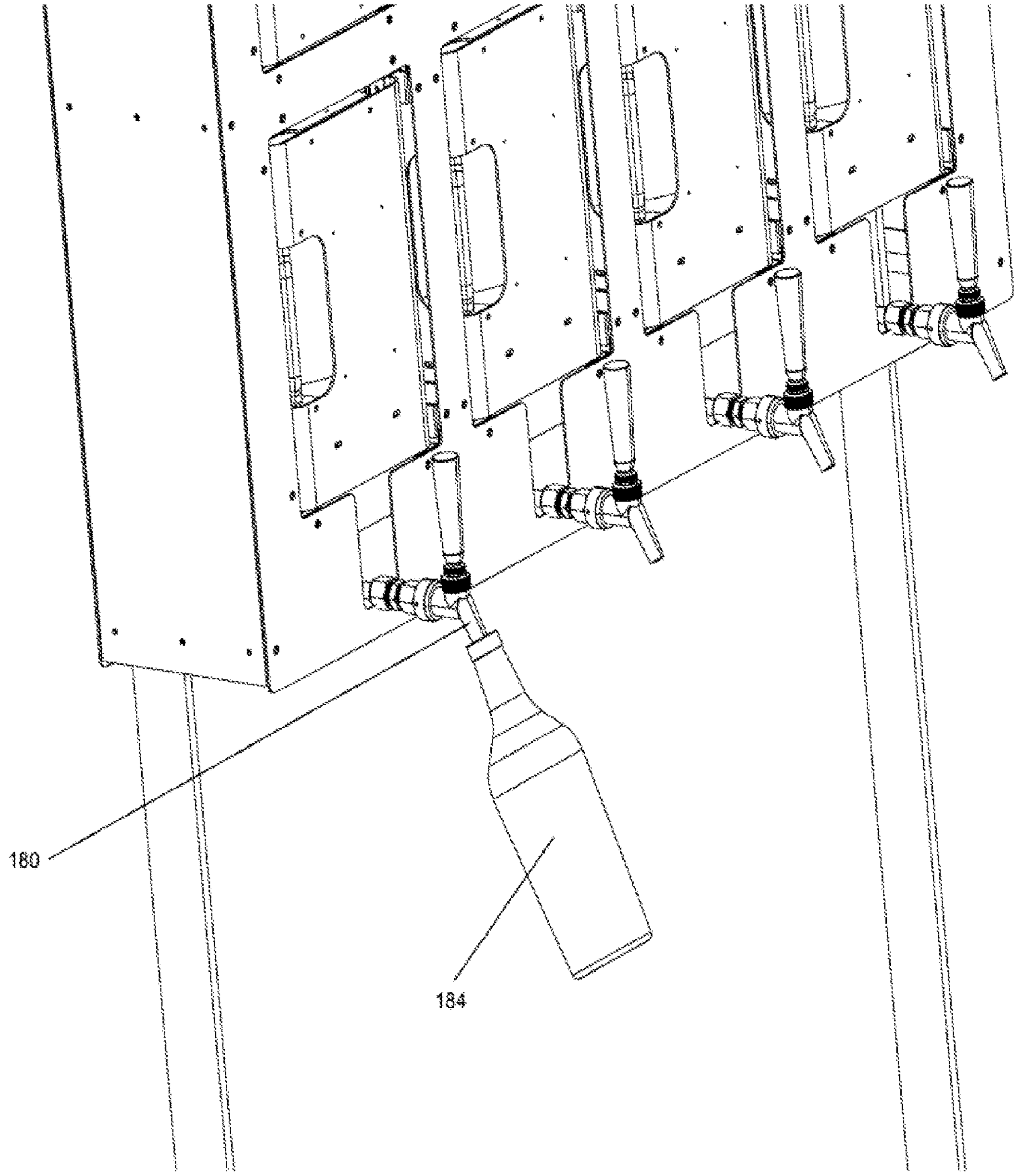
FIG. 6 illustrates the manner in which a vessel assembly supported in the dispensing station can be used to fill a spirits bottle.

The support 174 may be configured to facilitate dispensing from the specific dispensing assembly. In the present case, the support 174 includes a cutaway 178 for each vessel assembly, so that a nozzle 180 of the dispensing assembly projects through the cutaway 178 and is thereby accessible when the vessel assembly is on the support 174. As shown in FIG. 6, the nozzle 180 is thereby presented for filling a bottle 184 to refill the bottle 184.

Figure 7:
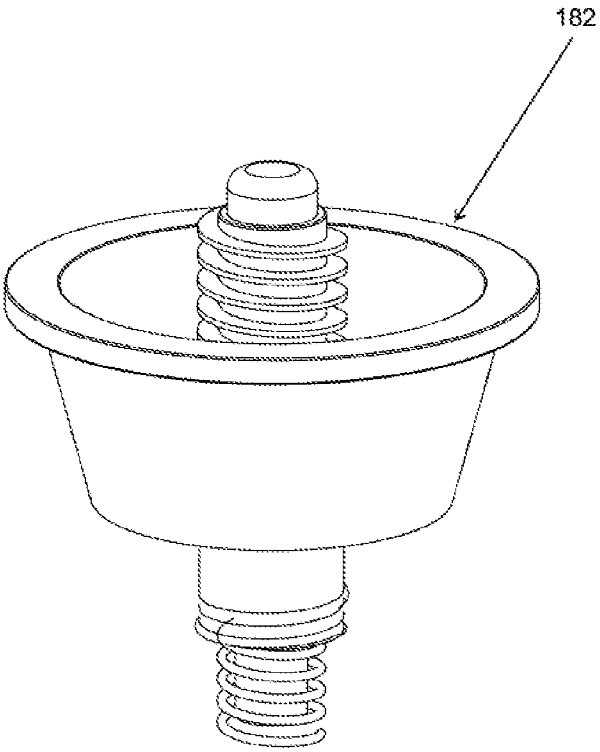
FIG. 7 shows an exemplary valved dispensing assembly for use in the closure section of a vessel as shown in FIG. 1.

The dispensing station 172 may instead be configured to facilitate dispensing from a dispensing assembly that includes a valve for selectively dispensing a predetermined volume of the liquid, with the valve oriented downwardly. Such a dispensing assembly 182 is shown in FIG. 7.

The dispensing station 172 may also be configured to stably seat the vessel assembly in the dispensing condition or in a position for storage. To that end the dispensing station 172 may comprise one or more protrusions or depressions (not shown) similar to protrusions 162 or depressions 164 of the vessel assembly. This enables a vessel assembly to be positively located and stably seated in a dispensing or storage condition in the dispensing station 172.

Vessel assemblies as taught herein enable a wide range of advantages over existing spirits distribution in current formats—e.g., 750 mL or 1 L. For example, the present vessel assemblies enable a dramatic reduction in:

- raw materials usage for producing the packaging (glass);
- cost when compared with single-use packaging (estimated at >95% reduction);
- cost to the beverage producer: no bottling line, no bottling line staff, no bottling line maintenance, less packaging inventory carrying costs, etc.;
- production labor (as much as 90%) associated with single use packaging; and/or
- weight of packaging per liter of spirits, during transit.

The present vessel assemblies have been designed for spirits distribution for which other drinks packaging—e.g., for juices and sodas—are unsuitable. Thus, the protective housing or enclosure enables use of glass, being the industry gold standard in spirits distribution. The protective housing is formed from aluminum.

Many modifications will be apparent to those skilled in the art without departing from the scope of the present invention.

Throughout this specification, unless the context requires otherwise, the word "comprise," and variations such as "comprises" and "comprising," will be understood to imply the inclusion of a stated integer or step or group of integers or steps but not the exclusion of any other integer or step or group of integers or steps.

What is claimed is:

1. A protective housing for carrying a rigid vessel containing liquid, the protective housing comprising:
- a casing comprising:
  - a peripheral wall;
  - a base; and
  - a top,
- wherein the base and the top are connected to the peripheral wall to define a volume for containing the rigid vessel,
- wherein the casing comprises an aperture for accessing a closure section of the rigid vessel while the rigid vessel is in the protective housing,
- wherein the aperture is in the top of the casing and the top is inset into the peripheral wall so that, in use, the closure section of the rigid vessel can protrude through the aperture while remaining within a profile of the peripheral wall,
- wherein the casing has an external profile, the protective housing further comprising a handle fixed to and within the external profile of the casing, and
- wherein the protective housing further comprises at least one tie connector on the casing for receiving a tie that passes through a closure connected to the closure section of the rigid vessel, thereby to indicate whether the closure has previously been removed from the rigid vessel.

2. The protective housing according to claim 1, wherein the casing comprises a window, the handle being secured across the window to thereby be accessible from outside the casing.

3. The protective housing according to claim 1, wherein the handle is spaced, in use, from the rigid vessel.

4. The protective housing according to claim 1, wherein the casing has a polygonal cross-section, the handle being disposed in a corner of the casing.

5. The protective housing according to claim 4, wherein the handle is one of two handles, the two handles being disposed in opposite corners of the casing.

6. The protective housing according to claim 1, wherein the peripheral wall of the casing is formed from at least two identical wall sections, each identical wall section having two opposed sides adapted to be connected to a respective opposed side of another of the at least two identical wall sections, thereby to form the peripheral wall.

7. The protective housing according to claim 6, wherein the peripheral wall has a polygonal cross-section, and each identical wall section comprises at least two panels, one of the at least two panels being wider than another of the at least two panels.

8. The protective housing according to claim 6, wherein at least one of the two opposed sides of each identical wall section comprises countersunk holes for receiving a head of a fastener for securing a first identical wall section of the at least two identical wall sections to a second identical wall section of the at least two identical wall sections.

9. The protective housing according to claim 1, wherein the peripheral wall has two opposite ends, with one or more protrusions at one of the opposite ends and at least one depression at another of the opposite ends, the at least one depression being arranged to receive one or more protrusions of another protective housing so that the protective housing can be stably stacked on top of an identical protective housing.

10. A vessel assembly for carrying a liquid, comprising:
- a rigid vessel comprising:
  - a body for containing the liquid; and
  - a closure section through which the liquid can be dispensed; and
- a protective housing according to claim 1, for carrying the rigid vessel.

11. The vessel assembly according to claim 10,
- wherein the protective housing further comprises an impact absorber disposed, in use, between the rigid vessel and the casing to reduce transfer, to the rigid vessel, of a force applied to the casing, wherein the impact absorber comprises a plurality of impact absorbing members, each of the peripheral wall, the base, and the top being spaced, in use, from the rigid vessel by a respective impact absorbing member of the plurality of impact absorbing members, wherein the respective impact absorbing member is removably attached to an internal surface of each of the peripheral wall, the base, and the top, and wherein the rigid vessel has a circular cross-section and the peripheral wall has a square cross-section having four sides of equal width, the rigid vessel abutting the respective impact absorbing member at midpoints of the four sides of equal width of the peripheral wall and being spaced from the peripheral wall at corners between the four sides of equal width.

12. The vessel assembly according to claim 10, wherein the closure is configured to seal the closure section, the at least one tie connector comprising a plurality of tie connectors equidistantly disposed about a circumference of the closure, the plurality of tie connectors being odd in number so that no tie connector of the plurality of tie connectors is diametrically opposite any other tie connector of the plurality of tie connectors.

13. The vessel assembly according to claim 10, wherein the closure section comprises, in use, a dispensing assembly for selectively dispensing the liquid.

14. The vessel assembly according to claim 13, wherein the dispensing assembly comprises a valve for selectively dispensing a predetermined volume of the liquid.

15. The protective housing according to claim 1, further comprising an impact absorber disposed, in use, between the rigid vessel and the casing to reduce transfer, to the rigid vessel, of a force applied to the casing.

16. The protective housing according to claim 15, wherein the impact absorber comprises a plurality of impact absorbing members, each of the peripheral wall, the base, and the top being spaced, in use, from the rigid vessel by a respective impact absorbing member of the plurality of impact absorbing members, wherein the respective impact absorbing member of the plurality of impact absorbing members is removably attached to an internal surface of each of the peripheral wall, the base, and the top.

* * * * *